Jan. 3, 1928.
L. MITCHELL
ICE CREAM CONE
Filed Jan. 28, 1927
1,654,825
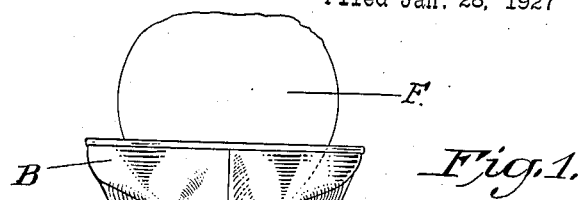
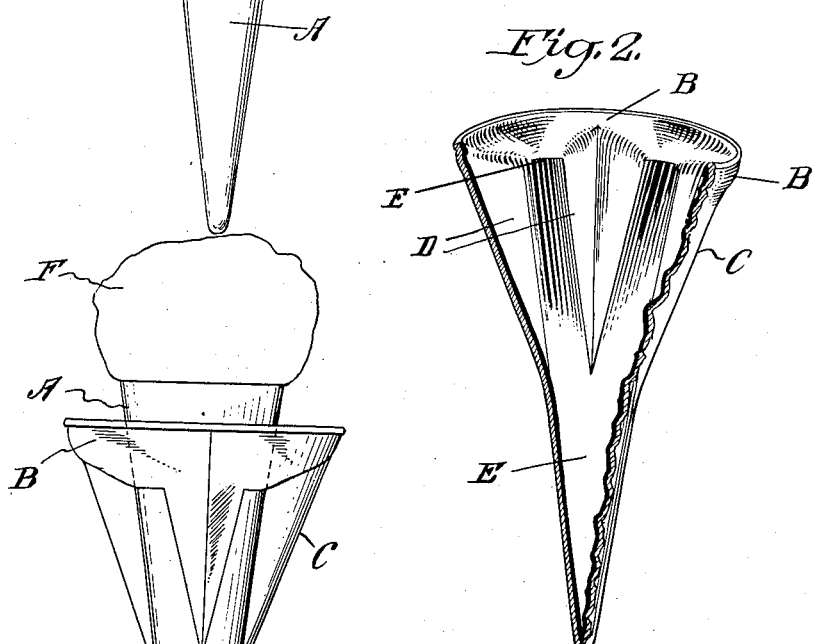
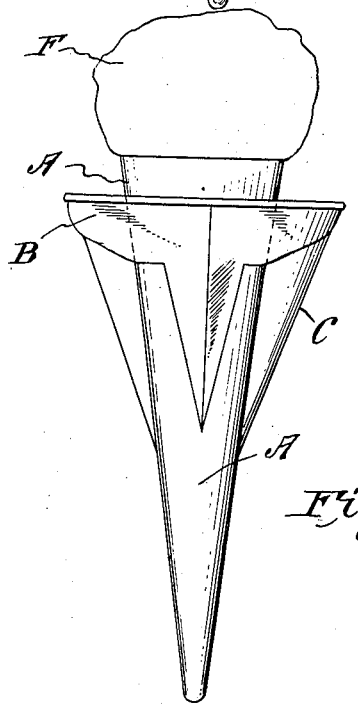
Leon Mitchell
*Inventor*
By Geo. B. Sanderlin
*Attorney*

Patented Jan. 3, 1928.

1,654,825

UNITED STATES PATENT OFFICE.

LEON MITCHELL, OF BALTIMORE, MARYLAND.

ICE-CREAM CONE.

Application filed January 28, 1927. Serial No. 164,285.

My invention relates to ice-cream cones made of edible material and adapted to be held in the hand while the cream is eaten therefrom. The object of my invention is to provide a cone of this type which will not permit the melted cream to flow over the outside of the cone and drip.

Ice-cream cones are usually made in conical or torch shape, and a lump of ice-cream is placed on the top thereof completely filling the cavity and projecting slightly over the rim. When this ice-cream begins to melt it flows over the outer surface of the cone and drips, soiling the fingers or clothes of the purchaser. This overflow and dripping is prevented by my non-drip ice-cream cone, illustrated in the accompanying drawings, in which, Figure 1 is an elevation of a cone embodying my invention, Figure 2 is a vertical section of same, and Figure 3 is an elevation of said cone with the annular saucer near the top.

Similar letters refer to similar parts throughout the several drawings.

The ice-cream cone or container is of the usual pastry material and consists of a hollow cone A having an integral annular saucer B, with rim turned upward, disposed horizontally around the outer surface of the upper portion of said cone. The location of this annular saucer B may be around the top or margin of the cone, as shown in Fig. 1, or said saucer may be disposed around upper portion of the cone near the top, as shown in Fig. 3, its function being to catch or receive the melted cream and prevent dripping from the outside of the cone.

Equi-spaced around the upper half of the cone, below the annular saucer B, is a plurality of vertically disposed bracket C integral with said saucer and the cone A. The function of these brackets, preferably four in number but there may be more or less as desired, is to provide strengthening supports for said annular saucer and to form the walls of the vertically disposed grooves D. These grooves D are on the inner side of the brackets C and communicate at upper end with the annular saucer B and at lower end with the cavity E of the cone, forming a channel or duct through which the melted cream flows from said annular saucer down into the cone cavity which is adapted to receive and retain the liquid cream.

When a lump of ice-cream F is placed in this non-drip ice-cream cone the melted cream drips into the annular saucer and flows thence through the grooves of the brackets into the lower cavity of the cone where it is retained until the remainder of the ice-cream is eaten. There is no overflow or dripping of melted cream from the outside of the cone.

What I claim is:

1. An ice-cream cone having an integral annular saucer around its upper portion, and a plurality of outward projecting integral brackets disposed vertically downward from said annular saucer and provided with grooves which communicate with the cone cavity.

2. An ice-cream cone having a cavity adapted to retain melted cream, an integral annular saucer around the outer surface of the upper portion of said cone, a plurality of integral brackets disposed vertically downward from said saucer, and grooves on the inside of said brackets communicating with said saucer and the cavity of the cone to form a channel through which the melted cream flows into the lower cone cavity.

3. An edible ice-cream container consisting of a cone having a cavity adapted to receive and retain melted cream, an integral annular saucer around the top of said cone, four vertical brackets equi-spaced and integral with said saucer and the portion of the cone below it, and grooves in said brackets communicating with the annular saucer and the cavity of the cone, all substantially as set forth.

LEON MITCHELL.